United States Patent
Lübcke

(10) Patent No.: US 6,433,827 B1
(45) Date of Patent: Aug. 13, 2002

(54) MEASUREMENT-FREE G2 CALIBRATION OF COLOR PICTURE TUBES

(75) Inventor: Gerold Lübcke, Haslach (DE)

(73) Assignee: Thomson Licensing SA, Boulogne, Cedex (FR)

( * ) Notice: Subject to any disclaimer, the term of this patent is extended or adjusted under 35 U.S.C. 154(b) by 0 days.

(21) Appl. No.: 09/543,690

(22) Filed: Apr. 5, 2000

(30) Foreign Application Priority Data

Apr. 13, 1999 (DE) .......................................... 199 16 740

(51) Int. Cl.⁷ ................................................ H04N 5/68
(52) U.S. Cl. ........................ 348/377; 348/379; 315/381
(58) Field of Search ............................... 348/377, 379, 348/380; 315/381, 382.1, 387, 291; H04N 5/68

(56) References Cited

U.S. PATENT DOCUMENTS

| 4,160,995 A | 7/1979 | Jensen ......................... 348/657 |
| 4,207,592 A | 6/1980 | Harwood ..................... 348/692 |
| 5,894,327 A | * 4/1999 | Griepentrog ................. 348/379 |
| 6,288,503 B1 | * 9/2001 | Sowig ......................... 348/379 |

FOREIGN PATENT DOCUMENTS

| DE | 2941429 A1 | 4/1980 |
| DE | 19625071 A1 | 1/1998 |
| DE | 19855628.4 | 12/1998 |
| DE | 19855628.4 | 12/1999 |
| DE | 19829031 A1 | 1/2000 |
| DE | 19916740.0 | 3/2000 |
| JP | 55045223 | 3/1980 |
| JP | 5-14923 | 1/1993 |

OTHER PUBLICATIONS

Summary of PD980084/19855628.8 Title, G2 Alignment Process.

* cited by examiner

Primary Examiner—Sherrie Hsia
(74) Attorney, Agent, or Firm—Joseph S. Tripoli; Harvey D. Fried; Francis A. Davenport

(57) ABSTRACT

A method for calibrating a screen grid voltage of the color picture tube in a color television set having automatic cut-off regulation. The method comprises the steps of, changing a normal operating potential at control electrodes of the color picture tube; adjusting the screen grid voltage about a value until values causing a fly-back line to be alternately visible and extinguished converge on the value; and, resetting the normal operating potential at the control electrodes of the color picture tube.

10 Claims, 4 Drawing Sheets a)

b)

MEASUREMENT-FREE G2 CALIBRATION OF COLOR PICTURE TUBES

BACKGROUND OF THE INVENTION

The invention relates to the screen grid calibration of colour picture tubes and in this case is based, in particular, on television sets having colour picture tubes in which the cut-off points are automatically readjusted by means of so-called automatic cut-off circuits. In the case of such television sets, it is customary to use colour picture tubes in which the screen grids (abbreviated to G2) of the three tube systems R, G and B are combined or have a common connection at the colour picture tube base.

Such screen grid calibration, referred to as G2 calibration below, is carried out in mass production of television sets, in particular, after a so-called "burn-in test" after the sets have been assembled. In this test the sets are operated as far as possible under operating conditions and this test serves for identifying and filtering out earlier failures. The G2 calibration comprises progressive voltage settings at the screen grids and measurement operations at the control electrodes of the colour picture tube, such as e.g. at the cathodes thereof in the case of the signal driving via the cathodes that is customary nowadays.

SUMMARY OF THE INVENTION

The invention relates to simplifying the calibration of grid 2 (G2) in apparatuses having an automatic cut-off circuit for cut-off point regulation of the color picture tube.

In a colour television with a cathode ray tube driven, as is customary, via the cathodes, an inventive arrangement is employed for calibrating grid 2 (G2) operating potential. Calibration of grid 2 (G2) potential is carried out in order to ensure that the video blanking signal VB is present at the cathodes in a specific voltage range in order that the available operating voltage $V_{cc}$ of the video output amplifier stages can be utilized optimally for the modulation and correct presetting is provided for the cut-off point, called cut-off below, of the respective tube system. In this case, it is not sufficient, however, to set the screen grid voltage to a specific value, since as shown by FIG. 4 with a given screen grid voltage a relatively large cathode voltage range arises on account of variations for the cut-off of the respective tube system and, given a screen grid voltage of e.g. 300 volts, can exceed, or impermissibly restrict, the voltage range available at the cathodes for signal modulation. The voltage range at the cathodes, which forms a so-called modulation window in this case, is bounded by the operating voltage $V_{cc}$ of the video output amplifier stages, on the one hand, and by the saturation voltage or behaviour thereof, on the other hand.

Therefore, for that cathode which is at the highest potential in the modulation window, a cathode voltage is defined for which the cut-off is achieved by appropriate setting of the screen grid voltage, in order to ensure that, at the respective cathode, the video signal—or the corresponding RGB signal—lies optimally in the modulation range bounded by the operating voltage $V_{cc}$ and the saturation voltage of the video output amplifier stages. In practice, however, in television sets with cathode control of the colour picture tube and automatic cut-off regulation, instead of the actual cut-off, a cathode voltage level which is known as a quasi cut-off and is defined by the circuit design is set with the aid of the screen grid voltage and corresponds to the test current of the cut-off regulating circuit, in which case—as already mentioned—the setting is oriented to that cathode which, compared with the remaining cathodes, has the respectively highest level with respect to the reference potential. In a cathode voltage level of this type, it is possible to take account of tolerances and/or ageing effects of the picture tube, in order that, during cut-off regulation, there is a reserve, in particular for the occurrence of maximum tolerances and/or ageing effects, which suffices to ensure that the RGB signals cannot be shifted into saturation of the video output amplifier stages, or—in the event of a tolerance- and/or ageing-dictated shift in the other direction—the cut-off points do not drift beyond the available operating voltage $V_{cc}$, the consequence of which would be that the tube could no longer be inhibited in the event of black and blanking levels and flyback stripes would thus occur. Consequently, it appears to be necessary to measure the cathode voltages.

For the G2 calibration according to the invention, however, it is possible to avoid measuring the cathode voltages as follows: the relatively large tube-dictated tolerances between the desired cut-off voltage of the cathode respectively at the highest voltage potential and the screen grid voltage to be set for this are in this case not included in the G2 calibration by way of measurement of the cathode voltages, rather a different criterion is advantageously used, namely making flyback stripes visible or the threshold in this respect from which flyback stripes actually become visible. This exploits the fact that, as is known, voltages lying above the respective cut-off are applied to the cathodes during the line and field flyback, in order to ensure that the cathode currents are blanked, that is to say prevented, during the respective time required for this. However, since the signal value "black" usually already lies in the cut-off, in connection with blanking the term "blacker than black" is used. If the screen grid voltage is then increased, the respective voltages between the cathodes and Wehnelt cylinders must also be increased correspondingly in order that the colour picture tube can still be inhibited. If the cathodes reach the maximum available voltage, limited by the operating voltage $V_{cc}$ of the video output amplifier stages, the colour picture tube can no longer be inhibited when the screen grid voltage is increased further, with the result that flyback stripes become visible.

Therefore, if the screen grid voltage is increased until flyback stripes occur and the screen grid voltage is subsequently reduced until the flyback stripes actually disappear again, it is possible to ensure that the cathode voltage of the cathode ray system whose cut-off is at the respectively highest voltage potential compared with the remaining cathode ray systems corresponds exactly to the maximum available cathode voltage. As a result, the maximum voltage range for signal modulation is available for this cathode.

In order to reliably avoid flyback stripes, however, it is customary to provide a certain voltage amount as a reserve. Furthermore, the ageing behaviour of the colour picture tube has to be taken into account. Due to cathode wear, the electric field strength between the cathodes and the Wehnelt cylinders decreases during the life of a colour picture tube. This wear is compensated for by increasing the cathode voltages with the aid of the automatic cut-off regulation, just called cut-off regulation below. The relationship between the ageing of a colour picture tube and the ageing-dictated shift in the cathode voltage, representing the cut-off, as a result of the cut-off regulation is illustrated in FIG. 3. This means that the screen grid voltage would then have to be reduced again to ensure that the resulting cut-off voltage of that cathode which—in comparison with the other two cathode ray systems—is at the respectively highest voltage potential is less than the maximum available cathode voltage determined by a specific amount (that is to say the abovementioned reserve plus a regulating range to be taken into account) (practical values: −10% . . . −15%).

By virtue of the invention, however, settings of the screen grid voltage to the value which corresponds to the maximum available cathode voltage are advantageously avoided. Instead, provision is made for changing over the Wehnelt cylinders of the colour picture tube which are at reference potential to a different or positive voltage potential which preferably takes account of the cathode voltage reserve explained above and of the effect of the cut-off regulation on the signal modulation range. This potential changeover occurs in each case at the beginning of the G2 calibration. Only then is the screen grid voltage set, in which case the operation of making flyback stripes or the like visible on the screen or the visibility threshold in this respect can advantageously be utilized as a setting criterion in this case as well. Afterwards, the potential changeover is reversed and the G2 calibration is thus ended.

The voltage difference to be provided for the potential changeover according to the invention can be determined e.g. empirically or with the assistance of diagrams like the diagrams shown in FIG. 3 and FIG. 4.

The G2 calibration according to the invention thus has the advantage that a single screen grid voltage setting is performed and advantageously measurement at the cathodes of the colour picture tube is rendered unnecessary. In addition there is a significant advantage, in particular for mass production of television sets, in that G2 calibration can be carried out with the rear panel of the TV set housing or case having been mounted.

BRIEF DESCRIPTION OF THE DRAWINGS

The invention is explained in more detail below using an exemplary embodiment with the aid of the drawing. In the drawing.

DESCRIPTION OF THE PREFERRED EMBODIMENT

Figure 1:
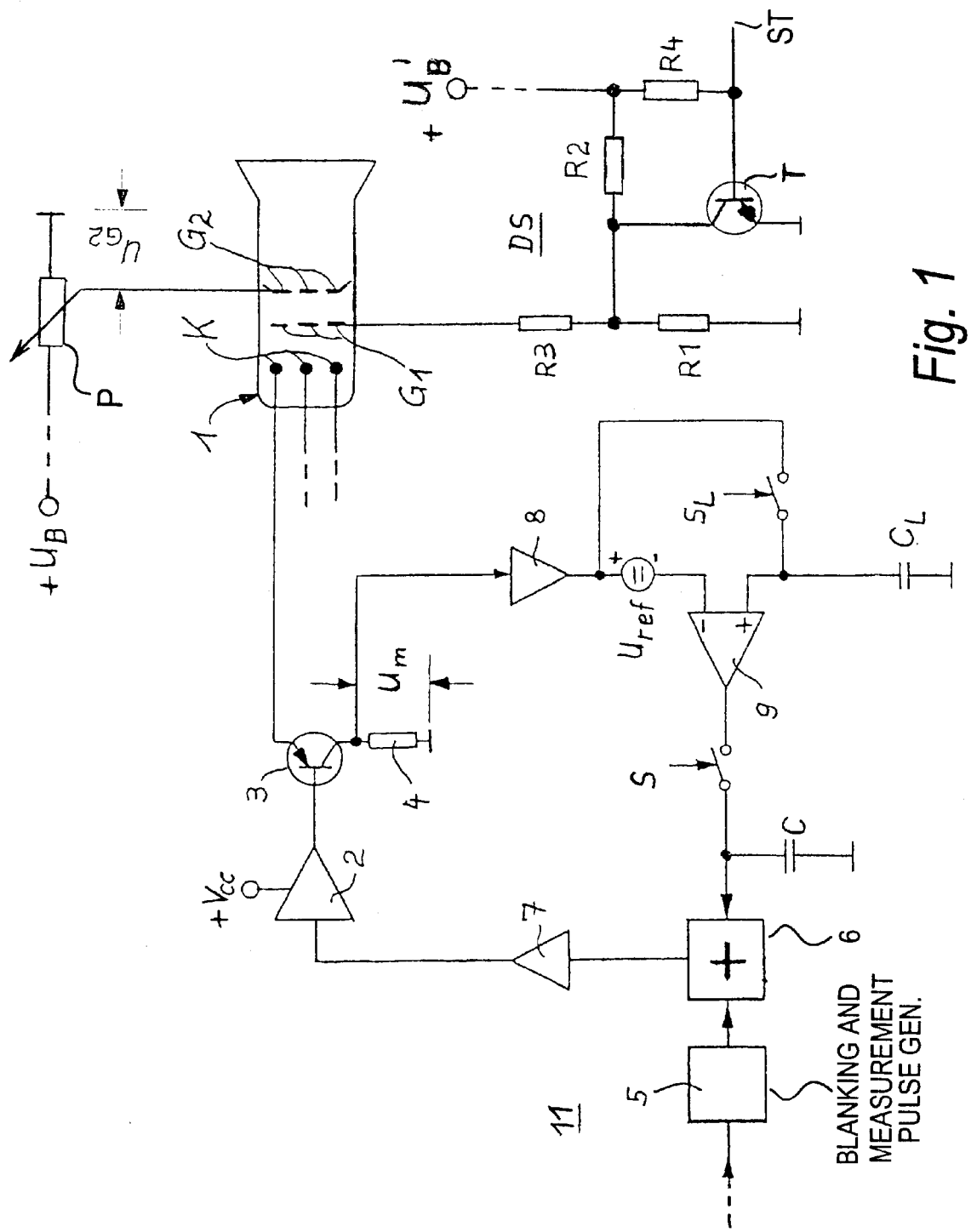
FIG. 1 shows one of the RGB signal-processing signal paths with the colour picture tube of a television set.

FIG. 1 uses a block diagram to show one of the identical colour channels of an RGB colour signal-processing circuit with cut-off regulation of the respective tube system of a colour picture tube 1. For the G2 calibration of the colour picture tube 1, a potentiometer P having a tap is provided, which is intended to be arranged on the chassis of a television set and preferably be accessible for the G2 calibration through the rear panel of the housing of the said television set in a manner known per se. The tap of the potentiometer P, which is arranged between reference potential (earth) and a positive DC voltage $+U_B$, is connected to the screen grid $G_2$ of the respective tube system of the colour picture tube 1. Thus the screen grids $G_2$ can be set to a common positive screen grid voltage $+U_{G2}$ and the G2 calibration can preferably be carried out jointly for all three systems.

The colour picture tube 1 is preferably intended to be driven via its cathodes K, in which case the control grids $G_1$ of the colour picture tube 1, which control grids are designed as Wehnelt cylinders, should be connected to reference potential (earth) as is known. A measuring transistor 3 arranged between the cathode K of the respective tube system and the output of a corresponding video output amplifier stage 2 is provided, for measurement of the dark current, in the respective colour channel. For measuring the dark current, a cut-off measurement line is keyed in, in a known manner, in the respective colour channel during a field blanking interval by means of a blanking and measurement pulse generator circuit 5 which is arranged upstream of an addition stage 6 in the course of the RGB colour signal path.

The addition stage 6 in the respective colour channel controls the video output amplifier stage 2, via an output stage 7, with a summation signal. When the video signal is being processed, the summation signal is composed of the signal voltage of an RGB signal and a voltage which is updated e.g. in each case in a field-by-field manner and is stored in a storage capacitor C as a regulation voltage for the cut-off regulation of the RGB signal. When the regulation voltage—called cut-off regulation voltage below—is being determined, on the other hand, the pulse voltage of the cut-off measurement line that has been keyed and the cut-off regulation voltage resulting from the comparison of the voltage $U_m$ which is measured across the measuring resistor 4, with a reference voltage $U_{ref}$ form the summation signal.

When the cut-off regulation voltage is being determined, the voltage $U_m$ measured across the measuring resistor 4 is fed via a series circuit formed by a buffer stage 8 and the voltage source for generating a reference voltage $U_{ref}$ to the inverting input of an operational amplifier 9, which is designed as a comparator and whose non-inverting input is connected to reference potential via a storage capacitor $C_L$, which is provided for storing a voltage proportional to the leakage current. A sampling switch $S_L$ is provided for the e.g. field-by-field updating of this voltage which compensates for the influence of the leakage current. By means of the sampling switch $S_L$, the reference voltage source $U_{ref}$ can be connected to the non-inverting input of the operational amplifier 9 in such a way that it is bridged together with the two inputs of the operational amplifier 9 during the measurement and storage of the voltage proportional to the leakage current. The switch position illustrated is adopted when the cut-off regulation voltage is being determined.

The cut-off regulation voltage which is generated by the operational amplifier 9 designed as a comparator and is updated in accordance with the respective measurement cycle is in this case stored for the cut-off regulation via a sampling switch S in the storage capacitor C. The switch position illustrated is adopted during RGB signal processing.

In the case of the circuit section which has been described thus far and is known per se, the measurement pulse generator circuit 5, the stages 6, 7 and 8, the operational amplifier 9, the sampling switches S and $S_L$, and the reference voltage $U_{ref}$ are part of a video processor 11 designed as an integrated circuit.

The connection of the control grids G; of the colour picture tube 1 to reference potential is established, according to the invention, by means of an electronic switch DS designed as a changeover switch.

With this switch DS, which is arranged e.g. together with the video output amplifier stages 2 on a so-called picture tube printed circuit board (not illustrated), according to the invention—as described in more detail below—for the G2 calibration a voltage potential changeover is carried out at the control grids $G_1$ of the colour picture tube 1.

The switch DS can be realized e.g. in a simple manner by means of a voltage divider comprising non-reactive resistors and an npn transistor T to be operated as an electronic switch. To that end, the emitter of the transistor T is connected to reference potential (earth). The collector-emitter path of the transistor and a first resistor R1 are connected in parallel with one another and are connected via a second resistor R2 to a positive operating voltage $+U_B'$, which can be derived e.g. from the positive operating voltage $+V_{cc}$ of the video output amplifier stages 2. The parallel circuit formed by the collector-emitter path of the transistor T and the first resistor R1 is furthermore connected to the control grids $G_1$ of the colour picture tube 1 via a third resistor R3. The base of the transistor T, which forms the control input of the switch DS, is connected to the positive operating voltage $+U_B'$ via a fourth resistor R4.

The control signal ST fed to the base of the transistor T for the purpose of controlling the switch DS is such that the transistor T is turned on, that is to say operates in the saturation mode, for normal operation of the television set, with the result that the control grids $G_1$ practically carry the reference potential. For the G2 calibration, on the other hand, the transistor T is turned off, with the result that the control grids $G_1$ carry a voltage potential which is determined by a divider ratio which is practically formed by the first (R1) and second (R2) resistors and can be advantageously predetermined—in particular taking account of the cathode voltage reserve already explained and the effect, likewise already explained, of the cut-off regulation on the signal modulation range as a result of the colour picture tube ageing effects.

Since just two signal states are necessary for the control signal ST, the latter can also be generated by means of a microprocessor which is used in any case in contemporary television sets, with the result that the G2 calibration can advantageously be carried out by means of an apparatus operating command that is to be appropriately provided. With the assistance of an optical measuring apparatus with sensors which can be used to evaluate the screen of the television set during the G2 calibration in accordance with a setting criterion, it is possible, moreover, to completely automate the G2 calibration.

Figure 2:
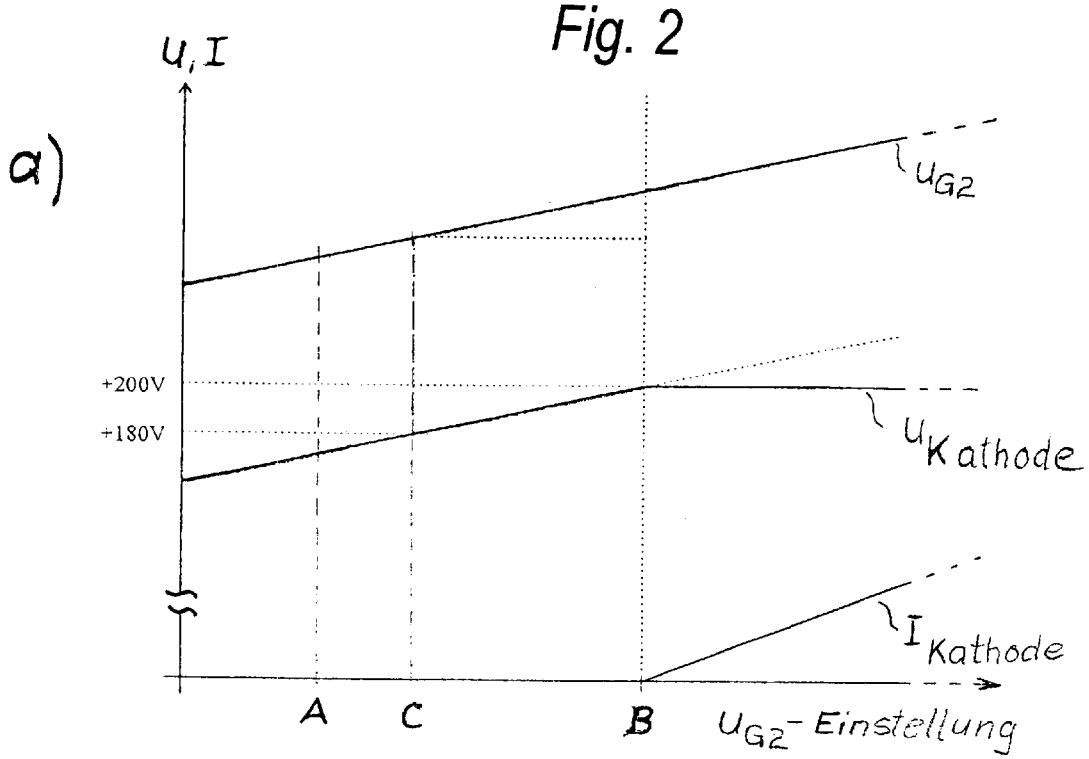
FIG. 2 shows diagrams for illustrating the G2calibration.
Figure 2:
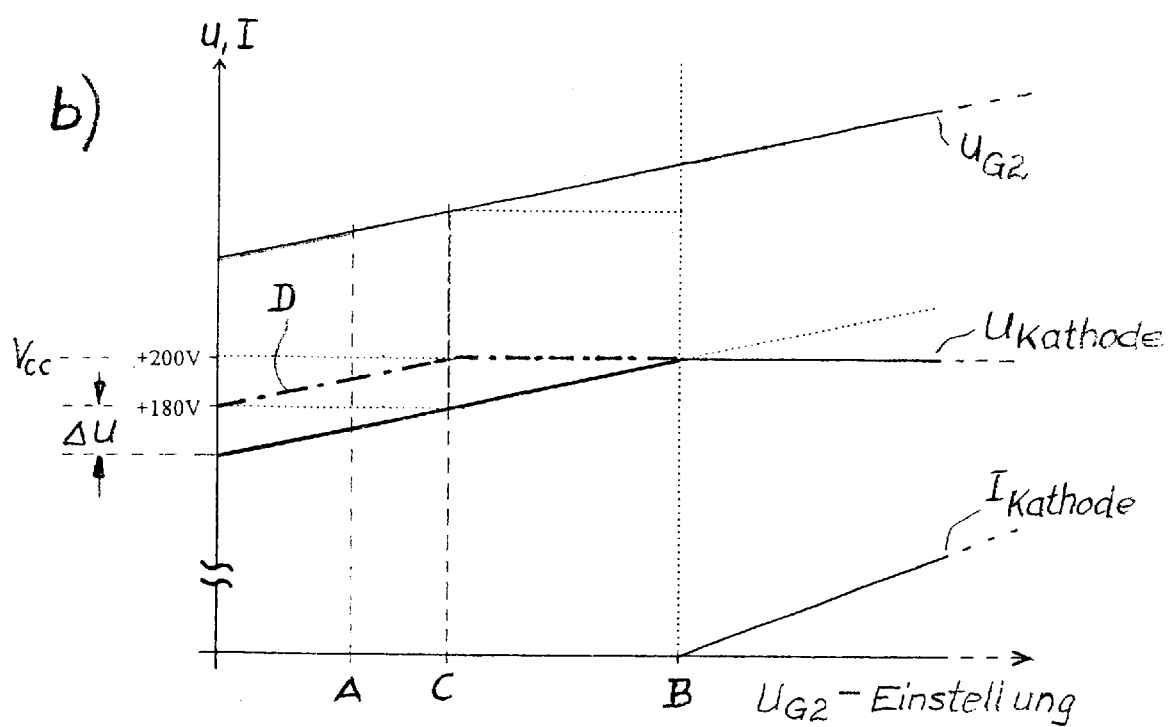

The principle behind the G2 calibration is described below with reference to similar diagrams a) and b) illustrated in FIG. 2, where diagram a) is supposed to be based on a G2 calibration which is described in DE 198 55 628.4, which was not published before the priority date, while diagram b) is supposed to illustrate the G2 calibration in accordance with the present invention.

The diagrams a) and b) illustrate, by way of example, in addition to the profile of the screen grid voltage $U_{G2}$, the respective profile of the cathode voltage $U_{cathode}$ for the cut-off as a function of the screen grid voltage setting, called $U_{G2}$ setting below. The respective ordinate of the diagrams a) and b) is a scale for the screen grid voltage $U_{G2}$, the cathode voltage $U_{cathode}$ and the cathode current $I_{cathode}$. The voltage values which are specified here on the ordinate and are assigned to the cathode K are by way of example and refer e.g. to the reference potential (earth).

A cathode voltage profile of this type is typical for cut-off regulation. On account of the cut-off regulation, the cut-off of the respective tube system of the colour picture tube 1 correspondingly follows the screen grid voltage profile as far as the maximum voltage value which is available to the cathodes K for modulation and is called "blanking" threshold below. As is known, depending on the circuit design used, the operating voltage $V_{cc}$ of the video output amplifier stages 2 or else a fixed DC voltage offset may correspond to the "blanking" threshold. A further increase in the screen grid voltage $U_{G2}$ can then no longer be corrected by the cut-off regulation—before that the said correction was effected by a corresponding shift in the cut-off along the cathode voltage profile parallel to the screen grid voltage profile—, with the result that cathode current $I_{cathode}$ starts to flow and field and/or line flyback stripes, just called flyback stripes below, thus become visible.

Proceeding e.g. from a predeterminable $U_{G2}$ presetting in accordance with a value A on the respective abscissa of the diagrams a) and b), and with the feeding of a black picture into the television set —e.g. by means of a video signal generator (not illustrated)—, in the case of the G2 calibration described in DE 198 55 628.4 in a first step, the screen grid voltage $+U_{G2}$ is increased until flyback stripes become visible. In this case, the fact that flyback stripes become visible is utilized as an indicator of the fact that the cathode K at the largest positive voltage potential compared with the remaining cathodes K is already bordering the "blanking" threshold. In the diagram a), an abscissa value B, starting from which a further increase in the screen grid voltage $U_{G2}$ leads to the cathode current $I_{cathode}$ flowing and thus flyback stripes become visible, corresponds to the "blanking" threshold. In a second step, the screen grid voltage $+U_{G2}$ is then reduced until the flyback stripes actually disappear—or just remain visible and can thus be measured by means of optical sensors—, the transition being utilized as an indicator of the fact that the cathode K at the largest possible voltage potential is now at the "blanking" threshold. Investigations have shown that the transition can be detected by the human eye with such accuracy that errors are practically precluded. Instead of using the human eye for detecting the transition, it is also possible to use measuring apparatuses with optical sensors.

In a third and thus last step, in the case of the G2 calibration described in DE 198 55 628.4, the screen grid voltage $+U_{G2}$ is then reduced by a specific amount, in order to have a corresponding margin for maximum ageing effects of the colour picture tube 1 as well as a cathode voltage reserve (already mentioned) for the purpose of reliably avoiding flyback stripes. An abscissa value C, which identifies the screen grid voltage setting at the end of both the G2 calibration described in DE 198 55 628.4 and the G2 calibration according to the invention, is supposed to correspond to this amount.

In the case of the G2 calibration according to the invention, which is likewise intended to proceed from the $U_{G2}$ presetting in accordance with abscissa value A with a black picture being fed in, as the first step—in contrast to the G2 calibration described in DE 198 55 628.4—provision is made for changing over the control grids $G_1$ from reference potential to a positive voltage potential. The voltage difference that is provided in this case is intended to correspond to the abovementioned margin for maximum colour picture tube ageing effects and cathode voltage reserve.

A corresponding voltage difference $\Delta U$ at the respective cathode K corresponds to the changeover of the control grids $G_1$ from reference potential to the positive voltage potential. It brings about a parallel shift in the profile of the cathode voltage $U_{cathode}$ for the cut-off in such a way that the "blanking" threshold at the cathode K at the largest positive voltage potential (compared with the remaining cathodes K) is displaced to the abscissa value C, which identifies the screen grid voltage setting at the end of a G2 calibration. The profile of the cathode voltage $U_{cathode}$, which profile is shifted in parallel, is represented by means of the dash-dotted line D.

According to the invention, in a second step, practically all that is necessary is to set the screen grid voltage $+U_{G2}$ to a voltage value which corresponds to the abscissa value C, since, starting from this set value, as a result of the voltage potential changeover according to the invention at the control grids $G_1$, a cathode current $I_{cathode}$ starts to flow and flyback stripes thus become visible. In this case, the transition at which the flyback stripes actually become visible or just disappear is used as a setting criterion for the G2 calibration in this case as well.

In a further departure from the G2 calibration described in DE 198 55 628.4, all that is then needed, in the third and thus final step, is to reset the control grids $G_1$ to reference potential, whereby the parallel shift in the cathode voltage profile representing the cut-off is reversed and the G2 calibration is ended.

The present invention thus has the advantage that practically only a single G2 setting step is necessary for the G2 calibration.

A further advantage is that with the G2 calibration according to the invention, which is not oriented, therefore, to a cathode voltage level corresponding to the quasi cut-off, the actual production tolerances of the colour picture tube 1 are also detected at the same time, since the flyback stripes are used for the setting criterion.

Figure 3:
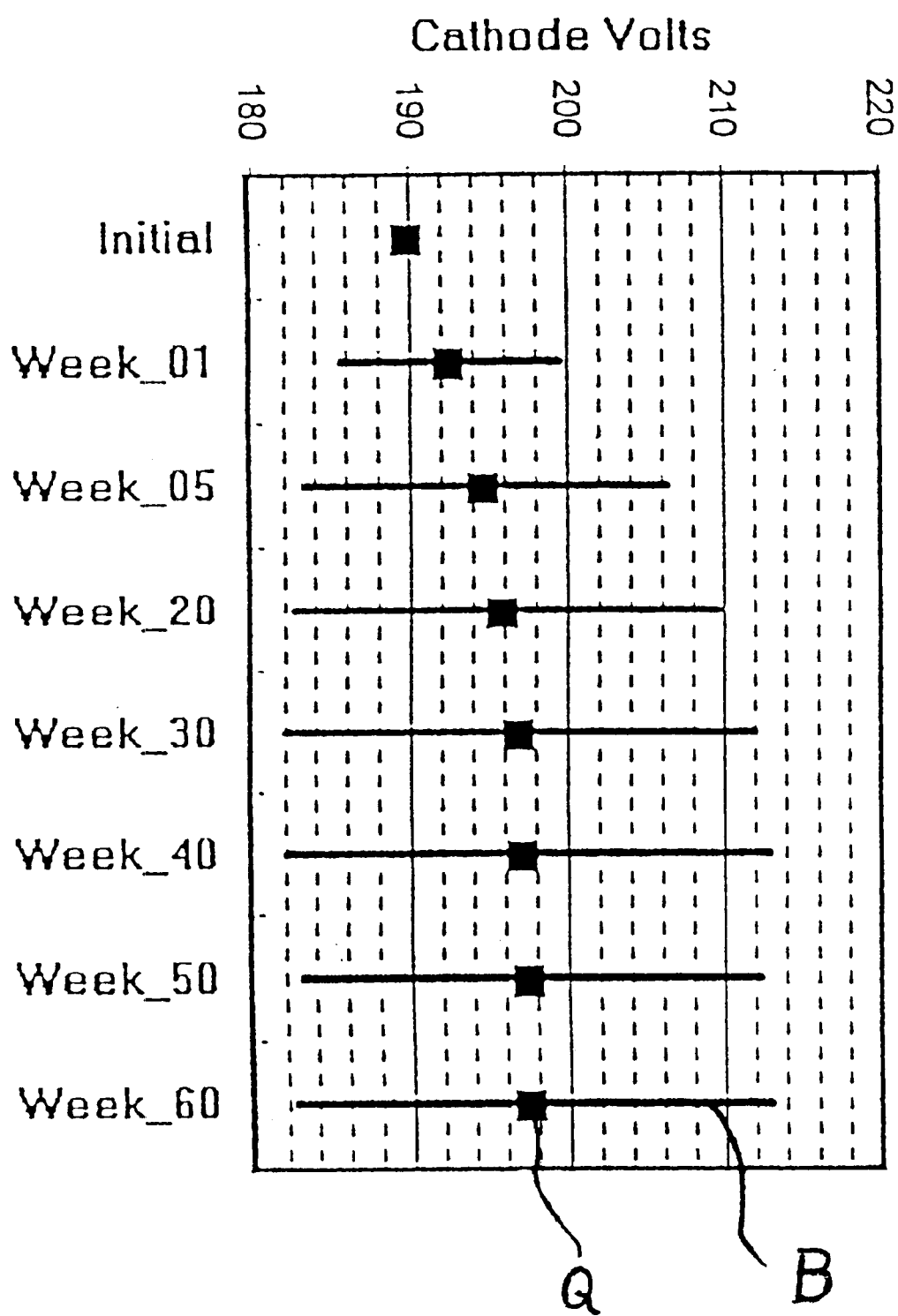
FIG. 3 shows the relationship between the ageing of a colour picture tube and the ageing-dictated shift in the cut-off as a result of the cut-off regulation.
Figure 4:
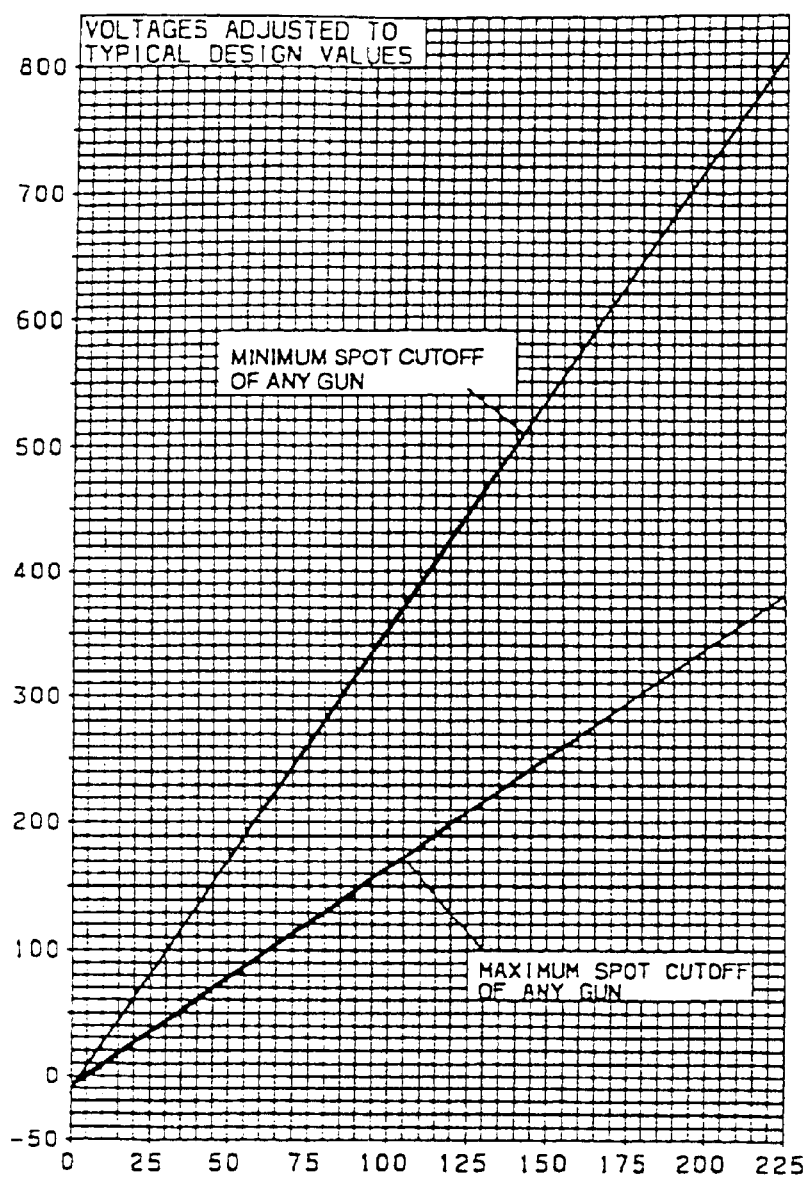
FIG. 4 shows the dependence and variation range of the cut-off on the screen grid voltage of a colour picture tube, where mutually corresponding parts are provided with the same reference symbols.

The voltage difference provided as a margin for maximum ageing effects and the cathode voltage reserve can be determined in a relatively simple manner using the diagrams illustrated in FIG. 3 and FIG. 4.

In FIG. 3, using a diagram, the relationship between the ageing of a colour picture tube and the ageing-dictated shift in the cut-off as a result of the cut-off regulation is illustrated by way of example in FIG. 3. In this case, vertical bars B show the respective variation range of the cathode voltage for the cut-off as a function of the ageing in weeks (from 1 to 60 weeks), while the respective average value is represented with the aid of squares Q.

FIG. 4 uses a diagram to show the dependence and variation range of the cut-off on the screen grid voltage $+U_{G2}$. In this case, the abscissa represents the voltage difference in volts between a cathode K and the corresponding control grid $G_1$ of the colour picture tube 1, the said control grid being designed as a Wehnelt cylinder. This voltage difference simultaneously corresponds to the cathode voltage, since, in accordance with FIG. 1, the control grids $G_1$ are practically connected to reference potential via the electronic switch DS during normal operation of the television set. The same should also be applied correspondingly with regard to the ordinate which represents the voltage difference in volts between the screen grid $G_2$ and the corresponding control grid $G_1$, of the colour picture tube 1.

This diagram, which is based on a typical colour picture tube, illustrates that there is a relatively wide range between an assumed cathode voltage $U_{cathode}$ for the cut-off and the screen grid voltage $+U_{G2}$ required therefor. Therefore, a use of different colour picture tubes leads, with regard to the voltage potential changeover of the control grids $G_1$ in accordance with the invention, to differences which—as is shown below—do not, however, necessitate individual adaptations of the voltage potential changeover according to the invention to the colour picture tubes.

These differences can be calculated using the following mathematical relationships (I) to (IV):

$$U_{cathode(a)} - U_{GI(a)} = \frac{U_{G2} - U_{GI(a)}}{S} \quad (I)$$

where $U_{cathode(a)}$=the cathode voltage during the G2 calibration,
$U_{G1(a)}$=a voltage potential of e.g. +30 volts on account of the changeover of the control grid G1 in accordance with the invention, and
$S=\Delta U_{G2}/\Delta U_{cathode}$ of a given colour picture tube;

$$U_{cathode(n)} - U_{GI(n)} = \frac{U_{G2} - U_{GI(n)}}{S} \quad (II)$$

where $U_{cathode(n)}$=the cathode voltage after the G2 calibration,
$U_{G1(n)}$=the voltage potential of practically 0 volts on account of the resetting of the control grid G1 to reference potential in accordance with the invention.

Assuming that the screen grid voltage $+U_{G2}$ is constant, and on the basis of the voltage potential changeover according to the invention at the control grids G1 from reference potential to a positive voltage potential of e.g. +30 volts, the previous equations (I) and (II) produce, by way of the elimination of the screen grid voltage $+U_{G2}$, the following equations $$U_{cathode(C)} - U_{cathode(A)} = \frac{S-1}{S} * (U_{GI(C)} - U_{GI(A)}) \quad (III)$$

and $\quad (IV)$ $$\Delta U_{cathode} = \frac{S-1}{S} * \Delta U_{GI}$$

where, using equation (IV), the influence of the voltage potential changeover according to the invention on the cut-off can then be calculated in a simple manner.

Since the range from $S_{min}$, to $S_{max}$ is dependent on the gun of the respective picture tube type,—taking such a diagram as a basis—the voltage potential changeover, according to the invention, of the control grids G1 from reference potential to a positive voltage potential of e.g. uniformly +30 volts, for the colour picture tubes listed below, results in the following relatively slight cathode voltage differences with regard to the cut-off:

| Coty M gun | ±4.5 volts | (Videocolor), |
| Vector gun | ±1.8 volts | (Videocolor) and |
| DF-III gun | ±2.2 volts | (Toshiba) |

On account of the slight difference, there is the advantage that it is not necessary to individually adapt the voltage potential changeover, according to the invention, of the control grids G1 to different guns of picture tubes.

What is claimed is:

1. Method for calibrating a screen grid voltage of the colour picture tube of a colour television set having automatic cut-off regulation comprising the steps of:
   changing a normal operating potential at control electrodes of the colour picture tube;
   adjusting said screen grid voltage about a value until values causing a fly-back line to be alternately visible and extinguished converge on said value; and, resetting said normal operating potential at said control electrodes of the colour picture tube.

2. Method for calibrating the screen grid voltage according to claim 1, wherein said changing step comprises;

applying a voltage to said control electrodes of the colour picture tube for compensation of ageing effects of the colour picture tube as a result of cut-off regulation plus a cathode voltage reserve.

3. Method for calibrating the screen grid voltage according to claim 2, wherein said applying step includes providing a voltage enabling use of different types of colour picture tubes.

4. Method for calibrating the screen grid voltage according to claim 1, comprising the step of mounting said colour television set in a cabinet prior to calibrating said screen grid voltage.

5. Method for calibrating the screen grid voltage according to claim 1, performing said changing, adjusting and resetting steps for calibrating said screen grid voltage with a black picture supplied to said colour television set.

6. A television set having screen grid voltage calibration of a colour picture tube, automatic cut-off regulation and where cathodes are driven by RGB signals; comprising:

a switch coupled to a control electrode of said colour picture tube and supplying a reference potential and a setting potential in respective normal and setting modes; and;

a potentiometer coupled to a screen grid of said colour picture tube and applying a positive voltage thereto, where in said setting mode said switch allows a potential greater than said reference potential to be applied to said control electrode of said colour picture tube and said potentiometer allows said positive potential applied to said screen grid to be varied to determine a voltage value where fly-back lines initially appear and initially disappear.

7. The television set according to claim 6, wherein said switch couples said control electrode of said colour picture tube to a ground reference potential in said normal mode.

8. The television set according to claim 7, wherein said switch couples said control electrode of said colour picture tube to a positive potential in said setting mode.

9. The television set according to claim 6, wherein said potentiometer is adjustable with a rear panel of the television set having been mounted.

10. A method for calibrating a screen grid voltage of a colour picture tube for the reproduction of video signals having automatic cut-off regulation with a DC voltage reference corresponding to a black value being set at cathodes of the colour picture tube which are driven by an RGB signal, comprising the steps of:

adding a voltage potential to a reference potential at the control electrodes of the colour picture tube;

varying the screen grid voltage such that fly-back stripes just become visible;

altering the screen grid voltage such that the fly-back stripes just become invisible; and, subtracting the voltage potential added to the reference potential.

* * * * *